United States Patent [19]

Sugino et al.

[11] Patent Number: 4,902,176
[45] Date of Patent: Feb. 20, 1990

[54] PROCESSING APPARATUS WHICH MAY BE SELECTIVELY SET IN TWO POSITIONS IN ACCORDANCE WITH FLUID PRESSURE

[75] Inventors: Takara Sugino; Noboru Kawanishi, both of Namerikawa; Kazuyuki Ishikawa, Uozu, all of Japan

[73] Assignee: Sugino Machine Limited, Uozu, Japan

[21] Appl. No.: 266,005

[22] Filed: Nov. 2, 1988

[30] Foreign Application Priority Data

Apr. 8, 1988 [JP] Japan ................................ 63-46863

[51] Int. Cl.$^4$ .............................................. B23B 47/18
[52] U.S. Cl. ....................................... 409/231; 408/4; 408/130
[58] Field of Search ................... 409/231; 408/4, 129, 408/130, 141

[56] References Cited

U.S. PATENT DOCUMENTS

| 2,114,389 | 4/1938 | Kingsbury | 408/130 |
| 3,277,748 | 10/1966 | Bechtol | 408/130 |
| 4,371,297 | 2/1983 | Hirose | 408/130 |

FOREIGN PATENT DOCUMENTS

| 57-47857 | 12/1982 | Japan . |
| 59-18173 | 4/1984 | Japan . |
| 61-58712 | 4/1986 | Japan . |
| 62-183107 | 11/1987 | Japan . |
| 476087 | 10/1975 | U.S.S.R. ............................ 408/129 |

*Primary Examiner*—Daniel Howell
*Attorney, Agent, or Firm*—Cushman, Darby & Cushman

[57] ABSTRACT

A drive shaft rotated by an electric motor is disposed to penetrate through a main body, and a spindle is concentrically mounted at the distal end of the drive shaft so that the rotational force of the drive shaft moving in an axial direction thereof is transmitted to the spindle. A processing drill head is selectively mounted at the distal end of the spindle that is coupled with a piston which is urged to a first position in an axially forward direction of the spindle by the fluid pressure supplied to a cylinder, for executing a processing work and a retreated position at which a hold mode is set. An abutting member is securely fitted to the outer surface of a piston rod, and a ring-shaped magnetic member is further provided to the outer surface of the piston rod in an axially movable manner, this ring-shaped magnetic member always being urged in the retreating direction. The abutting member abuts the ring-shaped magnetic member when it moves together with the piston rod in the forward direction, thereby moving the ring-shaped magnetic member. When the piston rod moves in the retreating direction, the abutting member stops at a second position where it abuts a fixed shockabsorbing member.

7 Claims, 2 Drawing Sheets

PROCESSING APPARATUS WHICH MAY BE SELECTIVELY SET IN TWO POSITIONS IN ACCORDANCE WITH FLUID PRESSURE

BACKGROUND OF THE INVENTION

1. Field of the Invention

The present invention relates to a processing apparatus such as an electric drill unit, and, more particularly, to a processing apparatus using a processing head such as a drill, which utilizes the pressure of fluid such as air to set the processing head at a first (advanced) position to execute a process with the processing head and to set the processing head at a second (retreated) position in a hold mode in which no processing is done.

2. Description of the Related Art

For instance, the Japanese Utility Model Publication No. 57-57857 discloses an electric drill unit as such a processing apparatus.

According to this electric drill unit, a spindle having a drill head mounted on its distal end is rotatably driven, via a drive shaft, by an electric motor, and this drill head is pressed against an object to be processed and is rotated to process this target object. In this case, the drill head can be selectively set at two positions: the first position where the drill head contacts the target object for a process and the second position where it is retreated or separated from the object to be in a hold mode in which no process is done.

The drill head is moved forward in parallel to its axis to be set at the first position and moved backward to be set at the second position, and a piston mechanism utilizing the pressure of fluid such as air is employed as means for moving the drill head between these two positions.

This piston mechanism is constituted by a cylinder and a piston which is disposed in the cylinder to be freely movable there in parallel to the axis of the cylinder and is coupled with the spindle having the drill head mounted thereon. The piston is set at the first or second position by controlling the compressed air within the cylinder, so that the drill head moving with the piston is also set at the first or second position.

In this case, the spindle and piston can be rotated together only by the mutual coupling section, so that, even with the spindle being rotated by the motor, the piston is not rotated within the cylinder.

Such an electric drill unit is often used with the drill head facing downward. In this state, when the drill head is in a working mode to contact a to-be-processed or target object, the spindle is set at the first position (or downward position in this state) and so is the piston. In the hold mode where no work is done, however, the drill head is moved upward to the second position to be separated from the target object, and the piston is also set at the upper position in this state; this upper position is maintained by the air pressure inside the cylinder.

Accordingly, when the air pressure within the cylinder to support the piston is reduced in this hold mode, the drill head section is moved downward due to the weight of the section including drill head and spindle and the tare of the piston, which may damage the unit itself and the target object as well.

As a solution to this problem, there needs some means to prevent the movement of the drill head from the second position to the first one when desired, namely, a fall preventing mechanism mounted to the piston mechanism. Such a fall preventing mechanism may be a mechanism for side-locking the piston rod, etc. by means of a small air cylinder rod or a holding mechanism for applying frictional force on the piston rod to restrict its movement. Installing such a fall preventing mechanism in the drill unit, however, complicates the overall structure of the processing apparatus and thus makes it more difficult to make the apparatus compact.

SUMMARY OF THE INVENTION

Accordingly, it is an object of this invention to provide a processing apparatus settable at two positions by the pressure of fluid such as air, which can securely hold a processing head at a safe hold position even when the fluid pressure in a piston mechanism is reduced, particularly, in a hold mode in which no processing is done, in a case where the processing head is set at the first (advanced) position in a working mode and at the second (retreated) position in the hold mode by the piston mechanism with the utilization of the fluid pressure.

It is another object of this invention to provide a processing apparatus which can hold the processing head away from the face of a target object in the hold mode particularly in a state where the processing unit is set vertically and the processing head is set downward and contacts the target object from the above.

It is a further object of this invention to provide a compact processing apparatus settable at two positions by a fluid pressure in which a mechanism for holding a processing head at a hold position is designed to have a simple structure.

According to the processing apparatus of this invention, a piston is selectively set at two positions within a cylinder by controlling the fluid pressure and this piston is coupled with a spindle having a processing head mounted at its distal end. The piston is integrally provided with a abutting member so that when the piston is moved in a first direction to advance the spindle, the abutting member abuts on a member made of a magnetic material, to move together with this member. When the piston is moved in a second direction to cause the spindle to retreat, the member moves together with the piston by means of a spring mechanism and is attracted to a fixed magnet, so that the abutting member is held by this member.

In thus constructed processing apparatus, with the processing head being set downward, the weights of the processing head and spindle and the tare of the piston are supported by the fluid pressure in the cylinder in the hold mode where the spindle is set at the second or retreated position. When the fluid pressure in the cylinder decreases in the hold mode due to a compressed-fluid source stopping its operation, leakage of the compressed fluid or some other reasons, the processing head falls due to the mentioned weights. When the processing head is at the second position, however, the abutting member integrally formed with the piston abuts on the absorbing member attracted and held by the magnetic, thus hindering the downward movement of the piston or spindle. Particularly, in the hold mode, the spindle can be safely held by a simple arrangement of the abutting member, absorbing member and magnet. Further, in moving the piston toward the first position by changing the fluid pressure within the cylinder, the absorbing member is separated from the magnet by the force acting on the piston, thereby moving the spindle toward the first position.

DETAILED DESCRIPTION OF THE PREFERRED EMBODIMENTS

Figure 1:
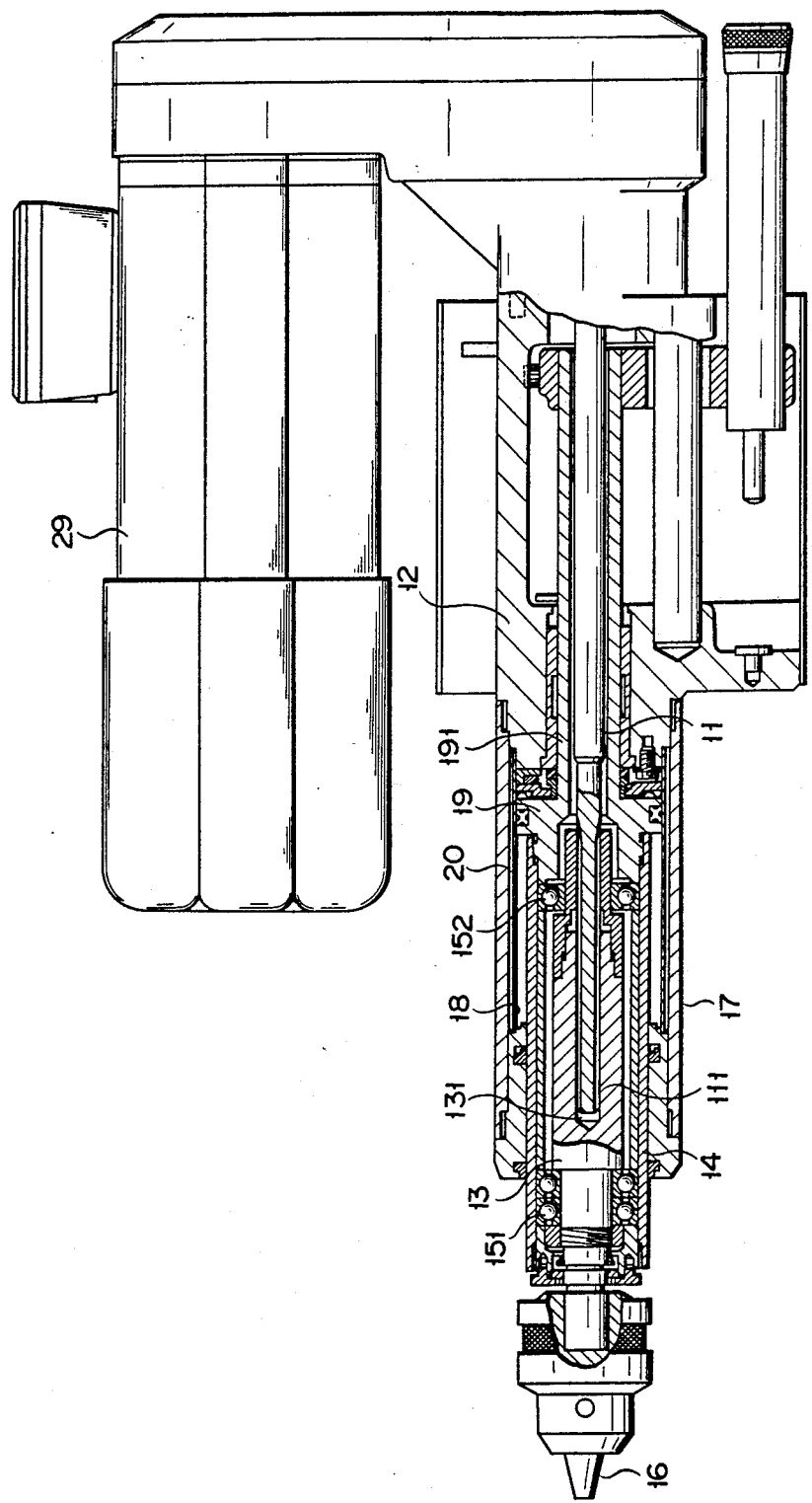
FIG. 1 is a partially-cutaway front view of a processing apparatus according to one embodiment of this invention.
Figure 2:
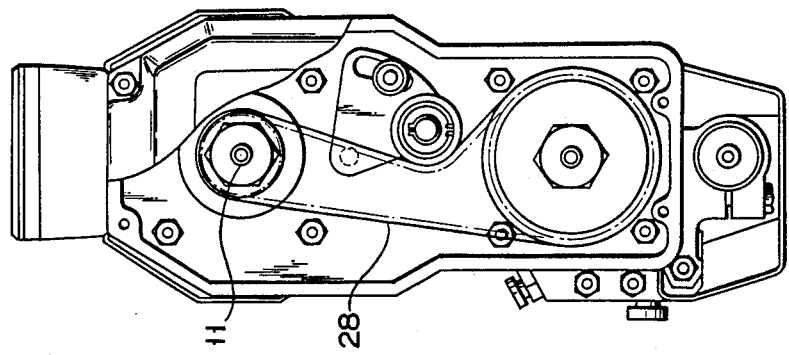
FIG. 2 is a front view of the processing apparatus.

FIGS. 1 and 2 illustrate the structure of an electric drill unit according to one embodiment of this invention, in which a drive shaft 11 is disposed in such a way as to penetrate the center shaft section formed in a unit main body 12. The drive shaft 11 has its distal end coupled to a spindle 13.

Spindle 13 is disposed inside a cylindrical ram 14 and its outer surface is supported by the inner wall of ram 14 via bearing mechanisms 151 and 152. Spindle 13 is concentrically disposed in ram 14 and is rotatably supported therein. A drill head 16 serving as a processing head is replaceably mounted at the distal end section of spindle 13.

Ram 14 is located in an inner section of a cylindrical body 17 integrally coupled to main body 12, and a cylinder 18 is also located in the inner section of body 17. Inside cylinder 18 is a piston 19 provided in such a way as to be freely movable within the cylinder in its axial direction. Piston 19 is integrally coupled to ram 14 so that when piston 19 is moved in cylinder 18 along its axis, ram 14 and spindle 13 are also moved therewith.

Drive shaft 11 is inserted in a coupling hole 131 formed in spindle 13 and coaxial with the axis of spindle 13, extending from the proximal-end of spindle 13, and is therefore coupled to spindle 13. In this case, a plurality of grooves 111 are formed in the periphery of drive shaft 11 in parallel to the axis thereof and grooves are formed in the inner periphery of spindle 13 so as to engage grooves 111. With drive shaft 11 inserted in coupling hole 131 of spindle 13, the drive shaft 11 can freely move within coupling hole 131 in the axial direction thereof, and spindle 13 can be rotated by the rotation of drive shaft 11.

The inner wall of cylinder 18 has an air duct 20 formed therein through which compressed air from a compressed-air source (not shown) is supplied to one of the two chambers formed in cylinder 18, and separated by piston 19. For instance, when the compressed air is supplied to the distal end side of the chamber on which drill head 16 is mounted, piston 19 is moved in the retreating direction opposite to the direction wherein drill head 16 is provided, and when the compressed air is supplied to the chamber more remote from drill head 16 than the other chamber, piston 19 is moved toward the distal end of spindle 13.

Piston 19 has a piston rod 191 provided to extend away from spindle 13. This piston rod 191 is cylindrically-shaped to surround the outer wall of drive shaft 11 and is movably supported at the center shaft section of main body 12 in the axial direction thereof.

Figure 3:
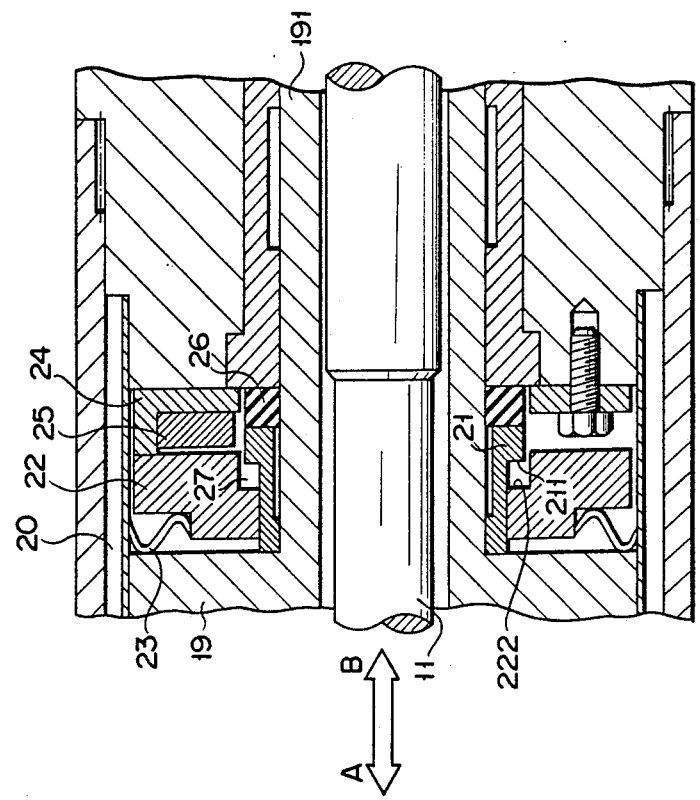
FIG. 3 is an enlarged cross-sectional view illustrating a second position holding mechanism section serving to hold particularly the position of a piston of the above processing apparatus.

FIG. 3 illustrates that portion of the processing apparatus which corresponds to piston rod 191. An abutting member 21 is integrally attached to the outer wall of piston rod 191 near the retreating side of piston 19. Abutting member 21 is formed in a ring shape so as to surround piston rod 191, has a projecting band formed on its outer wall, and has abutting wall 211 formed in that portion of the projecting band which faces piston 19.

A ring-shaped magnetic member 22 made of a magnetic material, such as iron, is fitted to the outer surface of abutting member 21. Magnetic member 22 is movable in parallel to the axis of piston rod 191 at the outer surface section of abutting member 21 and is always urged by a spring 23 in the retreating direction, away from piston 19.

A permanent magnet 25, surround by a yoke 24, is attached to that portion of main body 12 which faces the side of magnetic member 22 which is pressed by spring 23. With piston 19 moved in the retreating direction as illustrated, ring-shaped member 22 is attracted to permanent magnet 25. When piston rod 191 is moved in the distal end direction, abutting wall 211 of abutting member 21 abuts wall 222 of magnetic member 22 so that the movement of piston rod 191 in that direction is restricted by magnetic member 22. When a large force acts on piston rod 191 to move toward the distal end of spindle 13 (the direction of the arrow A), abutting member 21 exerts a large force on member 22 to move it toward the distal end of spindle 13, away from permanent magnet 25. And piston 19 is moved to the first position at the distal end of spindle 13.

When piston rod 191 is set at the retreating position and magnetic member 22, which is made of a magnetic material, is attracted to permanent magnet 25 as illustrated, abutting member 21 abuts shock-absorbing member 26 made of rubber or the like, and a gap 27 is formed between wall 222 of magnetic member 22 and abutting wall 211 of abutting member 21 in this state.

Therefore, when piston 19 set at the first position in the distal end direction is moved in the direction of arrow B, ring-shaped magnetic member 22 is moved by spring 23 in reaction to the movement of abutting member 21, and abutting member 21 abuts shock-absorbing member 26 after member 22 has contacted permanent magnet 25, thus stopping the movement of piston 19.

An electric motor 29 is coupled to the rear of drive shaft 11 through power transmission means such as a belt 28 and the motor, for driving drive shaft 11, thereby rotating drill head 16.

According to the electrical drill unit thus constructed, piston 19 is selectively moved in the retreating direction indicated by arrow B in FIG. 3 or in the distal end direction indicated by arrow A, depending on whether the compressed air coming through air duct 20 is supplied to the cylinder chamber located in the distal end direction of piston 19 or to the chamber located in the retreating direction. As illustrated, when piston 19 is set at the second position in the retreating direction, a hold mode wherein no processing is carried out is set.

In executing a process, compressed air is supplied to the chamber located at the retreating side of piston 19 in the illustrated hold mode to move piston 19 in the distal end direction. In moving the piston 19, as described earlier, ring-shaped magnetic member 22 is separated from permanent magnet 25 by means of abutting member 21 provided on piston rod 191 and is moved to retreating side. In this manner, piston 19 moves spindle 13 within a range allowed by cylinder 18, etc., so that drill head 16 is set at the first position. In this state, motor 29 is rotated to rotate driving head 16 through drive shaft 11 and spindle 13, and a target object is processed by rill head 16.

Upon completion of the processing work by drill head 16 set at the first position, the drill head 16 is set at the second retreating position to ensure safety. To move drill head 16 to the second position from the first position, the compressed air from air duct 20 is supplied to the cylinder chamber located in the distal end direction to move piston 19 in the retreating direction. As described earlier, the movement of piston 19 moves abutting member 21 until member 21 abuts shock-absorbing member 26 so as to set drill head 16 at the second position.

As should be understood from the above, in moving drill head 16 from the first position in the working mode to the second position in the hold mode, piston rod 191 abuts shock-absorbing member 26, and stops moving, while ring-shaped magnetic member 22 contacts permanent magnet 25 and stops moving before piston rod 191 has stopped moving. In this case, the force which causes magnetic member 22 to abut permanent magnet 25 is provided by spring 23, and the inertial force which piston rod 191 has at the time it moves to the second position does not serve as the force for causing member 22 to abut permanent magnet 25. This above-feature can make the abutting force of magnetic member 22 against permanent magnet 25 sufficiently small, and more particularly, it can reduce the impact force upon permanent magnet 25, thus surely preventing damage to permanent magnet 25 by the impact force applied thereto so that it can sufficiently endure the repetitive operation of the processing apparatus.

Assume now that this electric drill unit is of a vertical type in which its drill head 16 is set vertically. When drill head 16 is set at the second position or in the hold mode, the weights of drill head 16 and spindle 13 and the tares of piston 19 and piston rod 191, etc., associated with the piston are all supported by the air pressure within cylinder 18. When the air pressure in cylinder 18 is reduced due to leakage of the compressed air, the power created by the compressed-air source, etc., is also reduced thereby causing drill head 16 to naturally fall. With the drill unit used in such a vertical mannor, a target object must exist directly below drill head 16. When drill head 16 moves downward from the second position to contact the target object, it may also contact other obstacles, even in the hold mode, thus causing damage to not only the object but also to the drill head 16 itself.

According to the use of the electrical drill unit of this embodiment, with drill head 16 set at the second position (hold mode), ring-shaped member 22 contacts permanent magnet 25 and remains attracted thereto. Consequently, when piston rod 191 is moved in direction A as a result of the reduction in air pressure within cylinder 18, abutting member 21 abuts magnetic member 22 after traveling a distance corresponding to gap 27, thus stopping the movement of piston rod 191 in direction A, by the force which secures ring-shaped magnetic member 22, to permanent magnet 25. This prevents the falling of drill head 16.

Given that the force acting to secure ring-shaped magnetic member 22 to permanent magnet 25 is strong enough to endure the weights of drill head 16 and spindle 13 and the tare of the piston mechanism, drill head 16 can be prevented from falling even when the air pressure in cylinder 18 is reduced. In this case, in order to move drill head 16 to the first position for a processing work, piston 19 needs to be driven by the pressure of compressed air, and the driving force given to piston 19 in such an event works against the absorbing force by serving to separate absorbing member 22 from permanent magnet 25. As a result, drill head 16 is moved to the first position.

Although the above embodiment has been given with reference to an electric drill unit, it may be applied to a mechanism for moving a processing head in a processing apparatus which selectively sets the processing head at the first or second positions using the pressure of fluid such as air.

In this processing apparatus, in the state where the processing head is set at the first (protruding) position to be ready for a processing work, the processing head is pressed against a target object and is progressively moved beyond the first position by the piston mechanism in accordance with the process involving a cutting or drilling process.

What is claimed is:

1. A processing apparatus which may be selectively set in two positions in accordance with a fluid pressure, comprising:
    a spindle rotatably and movably disposed within a main body in an axial direction thereof and having a distal end with a processing head mounted thereon;
    a drive shaft concentrically coupled to a proximal end of said spindle in such a way that said drive shaft is movable in parallel to an axis of said spindle, and the rotation of said drive shaft is transmitted to said spindle;
    a piston mechanism, comprising a cylinder and a piston located in said cylinder, said cylinder being disposed in said piston mechanism to be concentric with said spindle and said drive shaft, said piston being coupled to said spindle in a mutually rotatable manner such that said piston when driven by a fluid pressure supplied to said cylinder moves said spindle to a first position toward said distal end of said spindle where said processing head is mounted or to a second position opposite to said first position;
    an abutting member movable with said piston;
    a shock-absorbing member disposed in such a way that said abutting member is abutted thereto, said abutting member being released from abutting said shock-absorbing member when said piston moves toward said second position;
    a magnetic member made of a magnetic material and engaging said abutting member when said piston moves toward said first position from said second position to be movable with said abutting member in a direction of said first position, said abutting member receiving force exerted on said magnetic member by a spring in the direction of said second position; and
    a magnet, fixed on said main body in such a way that said magnetic member contacts said magnet when said piston is at said second position, for attracting and holding said magnetic member when said piston is at said second position.

2. An apparatus according to claim 1, wherein a gap is formed between said magnetic member and said abutting member in such a state wherein said piston is set at said second position to cause said abutting member to abut said shock-absorbing member, said magnetic member being securely attached to said magnet.

3. An apparatus according to claim 1, wherein said piston has a piston rod extending in a direction away from said processing head, and said piston rod has a cylindrical hollow section penetrating an axial section of said piston, said drive shaft being disposed through said hollow section.

4. An apparatus according to claim 1, wherein said piston has a piston rod extending in a direction away from said processing head and said piston, and said abutting member is formed in a ring shape to be securely mounted on an outer surface section of said piston rod.

5. An apparatus according to claim 1, wherein said piston has a piston rod extending in a direction away from said processing head and said piston, said abutting member is formed in a ring shape to be securely mounted on an outer surface section of said piston rod, said member is ring-shaped to be fitted on an outer surface section of said abutting member, and said abutting member has an abutting wall on which it abuts said magnetic member when said piston rod moves in a direction wherein said processing head is located.

6. An apparatus according to claim 5, wherein said magnetic member is movably fitted on said outer surface section of said abutting member in an axial direction thereof, and said spring in a compressed state is disposed between said magnetic member and a face of said piston which exists on a retreating side thereof.

7. A processing apparatus which may be selectively set in a working position and a hold position respectively, in accordance with a fluid pressure, comprising:
- a spindle rotatably and movably located within a main body in an axial direction thereof and having a distal end with a drill head selectively mounted thereon;
- a drive shaft concentrically coupled to a proximal end of said spindle opposite to said drill head so as to be mutually movable in an axial direction thereof, a rotational force from an electric motor being transmitted to said drive shaft to rotatably drive said spindle;
- a cylinder disposed to surround said spindle and said drive shaft and to be concentric therewith;
- a piston coupled to said spindle in a mutually rotatable manner in such a way that said piston is selectively moved to a first position in a forward direction where said drill head exists or to a second position in a retreating direction, opposite to said forward direction, in accordance with a pressure of a fluid supplied in said cylinder;
- a piston rod integrally provided with said piston in such a way as to extend in said retreating direction of said piston, said piston rod being cylindrical such that said drive shaft is inserted in a center shaft section of said piston rod;
- an abutting member integrally formed on an outer surface section of said piston rod and having an abutting wall which faces said forward direction;
- a shock-absorbing member securely disposed on said outer surface section of said piston rod in such a way that said abutting member abuts said absorbing member when said piston rod moves together with said piston in said retreating direction so as to set said second position;
- a magnetic member made of a magnetic material and disposed on an outer periphery of said spindle to be movable in said axial direction thereof, said magnetic member coming into engagement with said abutting wall of said abutting member when moved in said retreating direction;
- a spring mechanism for urging said member to move in said retreating direction;
- a permanent magnet, fixed on said outer surface section of said piston rod in such a way that said permanent magnet contacts and attracts said magnetic member when said piston rod is moved in said retreating direction; and
- a gap formed between said abutting wall of said abutting member and said magnetic member in said hold mode where said piston rod is at said second position and said abutting member abuts said shock-absorbing member.

* * * * *